US012187595B2

(12) United States Patent
McGrane

(10) Patent No.: US 12,187,595 B2
(45) Date of Patent: Jan. 7, 2025

(54) FLUID LINE MONITORING AND CONTROL ASSEMBLY

(71) Applicant: Paul McGrane, Sioux Falls, SD (US)

(72) Inventor: Paul McGrane, Sioux Falls, SD (US)

( * ) Notice: Subject to any disclaimer, the term of this patent is extended or adjusted under 35 U.S.C. 154(b) by 454 days.

(21) Appl. No.: 17/537,604

(22) Filed: Nov. 30, 2021

(65) Prior Publication Data

US 2023/0166961 A1 Jun. 1, 2023

(51) Int. Cl.
*B67D 1/14* (2006.01)
*B67D 1/12* (2006.01)
*B67D 1/00* (2006.01)

(52) U.S. Cl.
CPC .......... *B67D 1/1411* (2013.01); *B67D 1/1243* (2013.01); *B67D 1/125* (2013.01); *B67D 1/1279* (2013.01); *B67D 2001/0093* (2013.01)

(58) Field of Classification Search
CPC ............... G01N 27/221; G01N 27/226; G01N 33/14–146; G01N 15/00; B67D 1/0841; B67D 1/1272; B67D 1/1411; B67D 1/1243; B67D 1/125; B67D 1/1279; B67D 2001/0093
See application file for complete search history.

(56) References Cited

U.S. PATENT DOCUMENTS 3,898,637 A * 8/1975 Wolstenholme .......... F17D 3/01 128/DIG. 13
4,406,382 A * 9/1983 Roth .................... B67D 1/1247 222/64
4,572,230 A * 2/1986 Mirabile ............... B08B 9/0325 222/400.7
4,979,641 A * 12/1990 Turner ................. B67D 1/1234 222/25
4,997,012 A * 3/1991 Kuziw ................. B67D 1/1234 222/77
5,431,302 A * 7/1995 Tulley .................... B67D 7/303 222/14
5,636,763 A * 6/1997 Furness ................ B67D 1/1245 222/61
5,986,573 A * 11/1999 Franklin ............... G01F 15/005 73/195

(Continued)

FOREIGN PATENT DOCUMENTS

DE 102016014587 A1 * 6/2018 ........... B67D 1/1245
DE 102021105449 A1 * 9/2021

*Primary Examiner* — Paul R Durand
*Assistant Examiner* — Randall A Gruby

(57) ABSTRACT

A fluid line monitoring and control assembly for detecting foaming and terminating flow in a beverage line includes a valve and a flow meter, which are insertable in-line with a conduit connecting a storage vessel to a dispensing tap, such that the valve is positioned proximate to the storage vessel. The valve can close the conduit to prevent flow of a beverage therethrough. The flow meter quantifies flow and can detect at least one parameter indicative of each of a liquid state and a foam state of the beverage and generates first and second signals, corresponding thereto. A controller receives the first signal and the second signal from the flow meter. Foam in line programming code positioned on the controller enables the controller to selectively actuate the valve to close the conduit upon receipt of the second signal. The valve limits flow of the beverage in the foam state past the valve.

8 Claims, 7 Drawing Sheets

(56) References Cited

U.S. PATENT DOCUMENTS 5,988,859 A * 11/1999 Kirk .......................... B67D 1/06 700/242
6,545,488 B2 * 4/2003 Yamagishi ........... G01N 27/221 73/61.41
6,669,051 B1 * 12/2003 Phallen ..................... B67C 3/28 222/394
6,965,243 B2 * 11/2005 Yamagishi ........... G01N 27/226 324/686
7,717,294 B2 * 5/2010 Bodemann ........... B67D 1/0878 222/61
8,733,592 B2 * 5/2014 Kitano ................. B67D 1/0888 222/64
10,072,962 B2 * 9/2018 Ismail ................. A47L 15/0055
10,392,238 B2 * 8/2019 Lawler ..................... B67D 1/07
10,464,799 B2 * 11/2019 Carson .................. B08B 9/0321
10,899,596 B2 * 1/2021 Renzi ................... B67D 1/0888
11,505,442 B2 * 11/2022 Hutchinson ............ G01N 15/00
11,613,455 B1 * 3/2023 Volftsun ............... B67D 1/1272 222/52
11,753,291 B2 * 9/2023 Cunneen .................. B67D 1/07 222/1
2002/0088823 A1 * 7/2002 Tabacchi .............. B67D 1/1234 222/52
2003/0183249 A1 * 10/2003 Nissinen .................. B67D 1/07 134/169 C
2006/0169715 A1 * 8/2006 Emmendorfer ....... B08B 9/0325 222/59
2007/0095859 A1 * 5/2007 Maser .................. B67D 1/0888 222/59
2008/0189078 A1 * 8/2008 Vok ...................... B67D 1/0831 702/188
2010/0170916 A1 * 7/2010 Segers ..................... B67D 1/07 222/1
2010/0176147 A1 * 7/2010 Segers ................. B67D 1/0837 222/1
2014/0263433 A1 * 9/2014 Merrifield ............ B67D 1/0867 222/66
2017/0233238 A1 * 8/2017 Bryant ................. B67D 1/0406 62/126
2020/0095111 A1 * 3/2020 Lorkowski ........... A61N 1/0468
2020/0247657 A1 * 8/2020 Christiansen ............ B67D 1/07

* cited by examiner

FLUID LINE MONITORING AND CONTROL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to monitoring and control assemblies and more particularly pertains to a new monitoring and control assembly for detecting foaming and terminating flow in a beverage line. The present discloses a control assembly including a flow meter and valve, wherein a change in an output signal from the flow meter is correlated to a change of state of a beverage in a beverage line from a liquid state to a foam state, and wherein the change of state prompts a controller to actuate the valve to close the beverage line.

(2) Description of Related Art Including Information Disclosed Under 37 CFR 1.97 and 1.98

The prior art relates to monitoring and control assemblies, and more particularly, monitoring and control assemblies for beverage lines, such as beer lines running between kegs or brite tanks and dispensing taps. Related prior art may comprise sensors that detect foam formation in vessels, such as tanks, reactors, and the like. Additional prior art may comprise optical sensors used to detect foam in lines. Still more prior art may comprise mechanical Foam-on-Beer (FOB) detectors with automatic line closing elements. What is lacking in the prior art is a control assembly combining a flow meter and valve, wherein a change in an output signal from the flow meter is correlated to a change of state of a beverage in a beverage line from a liquid state to a foam state, and wherein the change of state prompts a controller to actuate the valve to close the beverage line.

BRIEF SUMMARY OF THE INVENTION

An embodiment of the disclosure meets the needs presented above by generally comprising a controller, a valve, and a flow meter. The valve and the flow meter are communicatively engaged to the controller and are configured to be insertable in-line with a conduit connecting a storage vessel to a dispensing tap, such as a beer line connecting a keg or brite tank to a dispensing tap. The valve is positioned proximate to the storage vessel and is configured to selectively close the conduit to prevent flow of a beverage through the conduit.

The flow meter is configured to detect at least one parameter indicative of each of a liquid state and a foam state of the beverage and to generate a first signal and a second signal, respectively, corresponding thereto. The controller is enabled to receive the first signal and the second signal from the flow meter.

Volume calculation programming code positioned on the controller enables the controller to correlate the first signal to a volume of beverage passing through the conduit. Foam in line programming code positioned on the controller enables the controller to selectively actuate the valve to close the conduit upon receipt of the second signal. The valve is configured to terminate flow of the beverage in the foam state past the valve.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
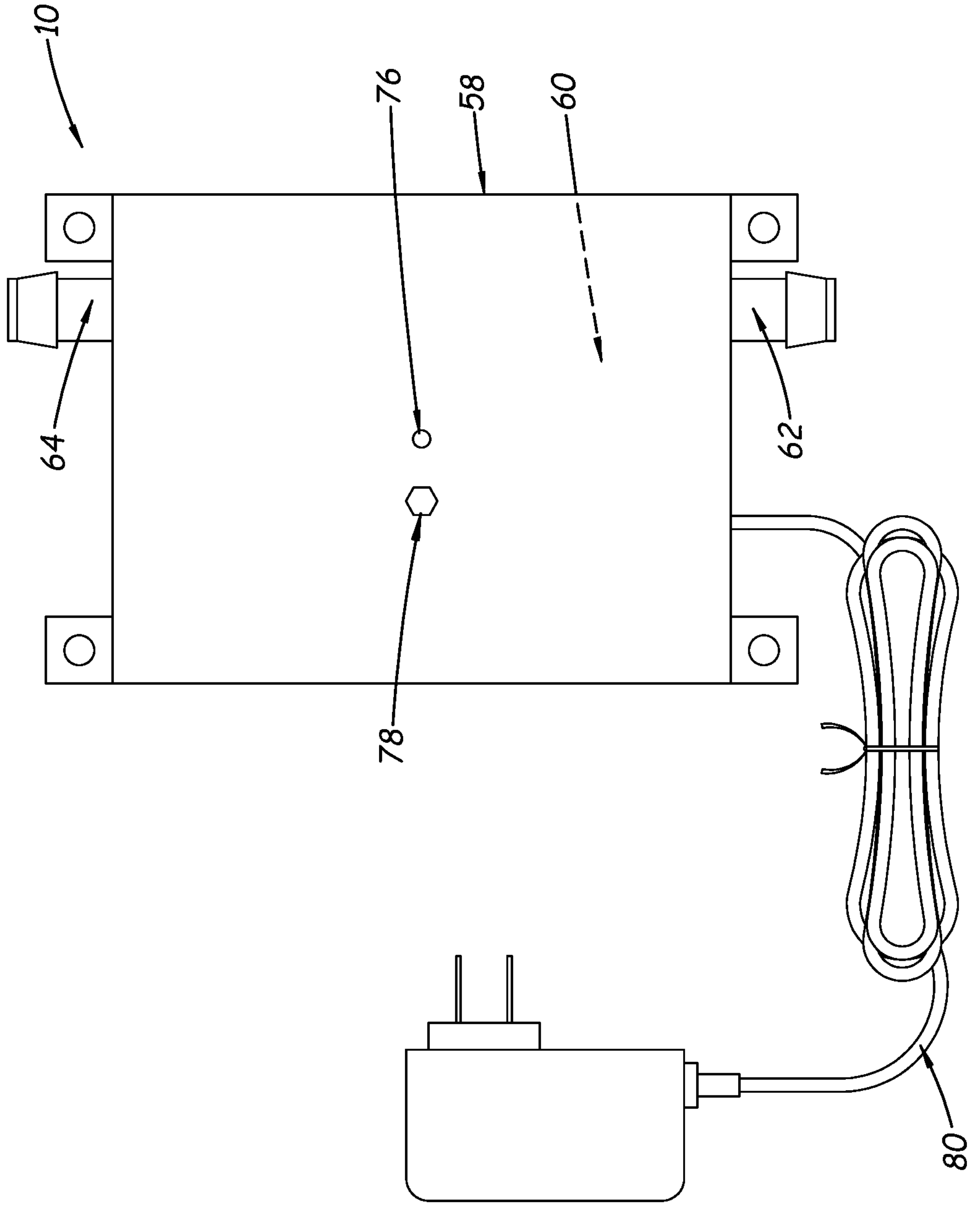
FIG. 1 is a top view of a fluid line monitoring and control assembly according to an embodiment of the disclosure.

With reference now to the drawings, and in particular to FIGS. 1 through 7 thereof, a new monitoring and control assembly embodying the principles and concepts of an embodiment of the disclosure and generally designated by the reference numeral 10 will be described.

Figure 2:
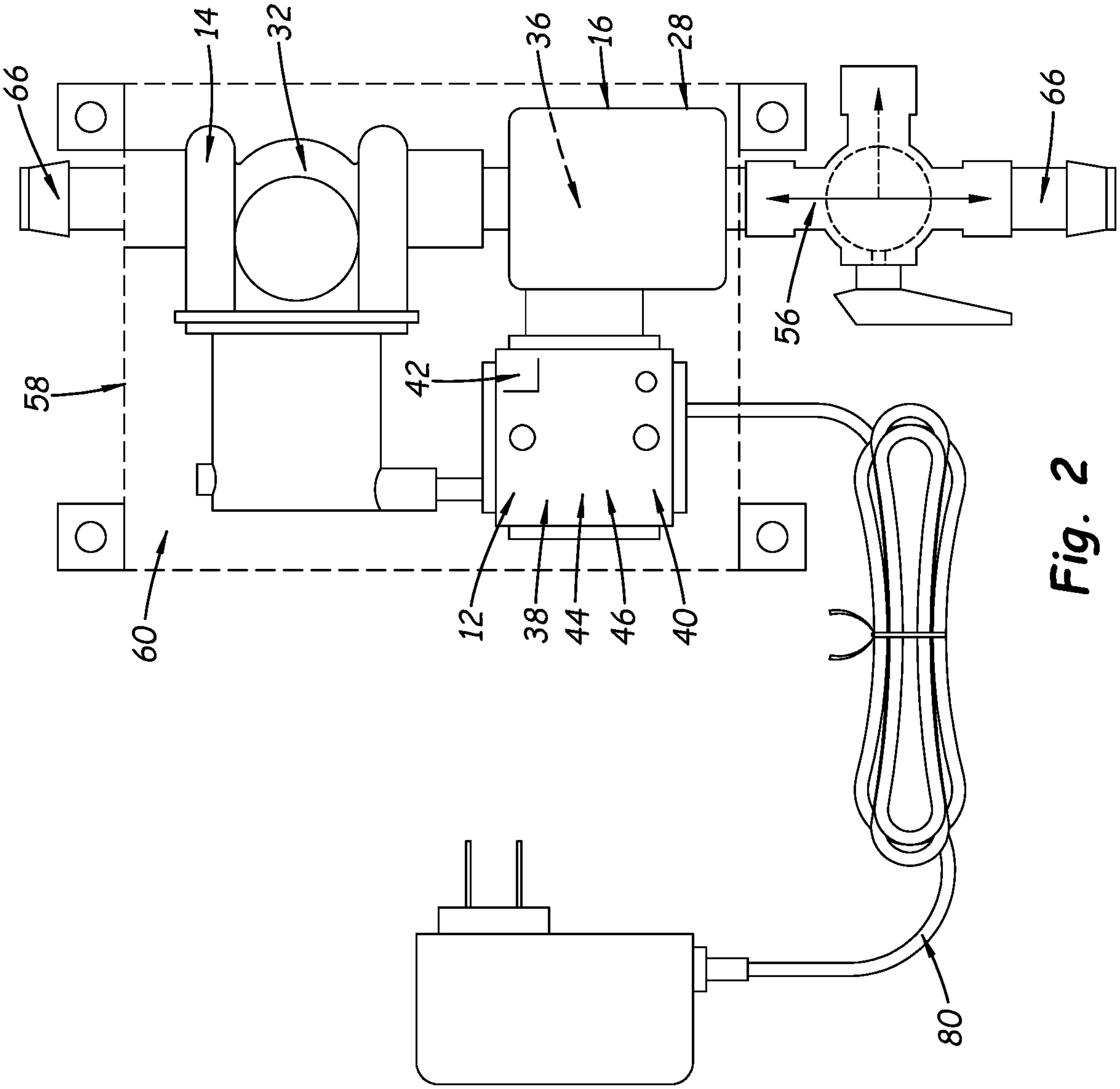
FIG. 2 is a top open view of an embodiment of the disclosure.

As best illustrated in FIGS. 1 through 7, the fluid line monitoring and control assembly 10 generally comprises a controller 12, a valve 14, and a flow meter 16. The valve 14 and the flow meter 16 are communicatively engaged to the controller 12 and are configured to be insertable in-line with a conduit 18 connecting a storage vessel 20 to a dispensing tap 22. The conduit 18 may comprise a beer line 24 used to connect the storage vessel 20, such as a keg 26, brite tank (not shown), or the like, to the dispensing tap 22. The valve 14 is configured to selectively close the conduit 18 to prevent flow of a beverage through the conduit 18. The valve 14 may comprise a solenoid valve 84, as shown in FIG. 2, or other type of actuated on-off valve, such as, but not limited to, pneumatic valves, hydraulic valves, electric valves, spring valves, and the like.

The flow meter 16 is configured to detect at least one parameter indicative of each of a liquid state and a foam state of the beverage and to generate a first signal and a second signal, respectively, corresponding thereto. As in the prior art, the first signal can be used to by the controller 12 to quantify the volume of the beverage that has flowed through the conduit 18. What is not anticipated in the prior art is utilization of a change from the first signal to the second signal as an indication of the beverage being in the foam state. It is anticipated the first signal and the second signal may take the same form, such as a voltage reading, but be of differing magnitude, stability, frequency, and the like. For example, a first signal generated by the flow meter 16 may comprise a substantially stable voltage reading when the beverage is in the liquid state. A second signal generated by the flow meter 16 may comprise an increased, a decreased, a variable, or a fluctuating voltage reading when the beverage is in the foam state. The change from a substantially stable voltage reading to an increased, a decreased, a variable, or a fluctuating voltage reading can provide a basis for the controller 12 to actuate the valve 14 to prevent the conduit 18 from filling with the beverage in the foam state.

As will be apparent to those skilled in the art of monitoring and control assemblies, the monitoring and control assembly 10 is intended for use with carbonated beverages, such as, but not limited to, beer, soda, and the like. Carbonated beverages should be interpreted, in the context of this disclosure, to include any liquid in which any gas is dissolved under pressure. For example, either carbon dioxide alone or as a mixture with nitrogen are used with beer.

The flow meter 16 may comprise a thermal mass flow meter 28, a mechanical flow meter, a pressure based flow meter, a variable area flow meter, an optical flow meter, a vortex flow meter, a sonar flow meter, an electromagnetic flow meter, an ultrasonic doppler flow meter, a Coriolas flow meter, a laser doppler flow meter, or the like. With these types of flow meters 14, the first signal can be correlated to a volume of the beverage in the liquid state passing through the conduit 18, allowing the controller 12 to quantify the volume of the beverage dispensed at the dispensing tap 22.

Flow meters 14 are routinely incorporated into beverage dispensing assemblies 30 and can be positioned anywhere in a conduit 18 between the storage vessel 20 and the dispensing tap 22. A constraint of the present invention, in that the flow meter 16 also is acting as a Foam on Beer detector 54, is that the flow meter 16 should be positioned as closely as possible to the storage vessel 20. While a single valve 14 positioned proximate to the flow meter 16 may be sufficient in many configurations to prevent foaming of the beverage within the conduit 18, other configurations may require a primary valve 32 positioned proximate to the flow meter 16 and a secondary valve 34 positioned proximate the dispensing tap 22.

The thermal mass flow meter 28 comprises a microelectromechanical system sensor 36, which is configured for thermopile sensing. The thermal mass flow meter 28 may be configured to measure liquid flow rates of between 0.0 and 10.0 liters/minute. A typical flow rate for beer in a beer line 24 is two ounces per second, which allows a pint of beer to be poured in eight seconds. This corresponds to a flow rate of 3.55 liters/minute.

Output from the thermal mass flow meter 28 is in the form of a voltage reading. Parameters that vary between the liquid state and foam state of the beverage, and which influence the voltage reading, include, but are not limited to, density, viscosity, thermal conductivity, and specific heat. With foam flowing past the microelectromechanical system sensor 36, the voltage reading observed differs from that obtained for with liquid. Specifically, with beverage in the liquid state flowing past the microelectromechanical system sensor 36 at a rate of approximately 3.55 liters/minute, the voltage is substantially constant at approximately 3.3-3.6 volts, whereas with foam flowing past the microelectromechanical system sensor 36, the voltage reading fluctuates rapidly. This change in signal can be used as the basis for the controller 12 to actuate the valve 14.

Foam in line programming code 38 is positioned on the controller 12 and enables the controller 12 to selectively actuate the valve 14 to close the conduit 18 upon receipt of the second signal. The valve 14 is configured to terminate flow of the beverage in the foam state past the valve 14. The present invention anticipates the foam in line programming code 38 comprising an algorithm 40 enabling the controller 12 to evaluate the first signal generated by the flow meter 16 for a change, or changes, in the first signal to determine if the beverage passing through the conduit 18 has changed from the liquid state to the foam state.

The controller 12 also may comprise a transceiver 42, which is configured to communicate wirelessly with an electronic device 52. The electronic device 52 may be part of a network. The transceiver 42, along with dispensing programming code 44 and volume calculation programming code 46 positioned on the controller 12, enables the monitoring and control assembly 10 to seamlessly replace both flow meters 14 and Foam on Beer detectors 54 which are incorporated into prior art beverage dispensing assemblies 30. The dispensing programming code 44 enables the controller 12 to selectively actuate the valve 14 upon dispensing of a selected volume of the beverage from the dispensing tap 22. The volume calculation programming code 46 enables cumulative integration of the first signal to determine a total volume of the beverage that has passed through the conduit 18, thus allowing a volume of the beverage remaining in the storage vessel 20 to be calculable from an initial volume of the beverage positioned in the storage vessel 20.

In a configuration wherein the primary valve 32 is positioned proximate to the flow meter 16 and the secondary valve 34 is positioned proximate the dispensing tap 22, the transceiver 42 would also serve to communicate signals from the controller 12 to the secondary valve 34 via a receiver 48 that is communicatively engaged to the secondary valve 34. Also in this configuration, the primary valve 32 can be of the normally-open type and the secondary valve 34 of the normally-closed type.

The fluid line monitoring and control assembly 10 may comprise a three-way valve 56, which is positioned in-line with and proximate to the flow meter 16. The three-way valve 56 is configured to bleed gas and foam, which may be positioned in the conduit 18 between the flow meter 16 and an empty storage vessel 20. The three-way valve 56 allows the conduit 18 to be filled with beverage after the conduit 18 has been disconnected from the empty storage vessel 20 and connected to a storage vessel 20 containing the beverage. The three-way valve 56 will be of use if the flow meter 16 cannot be positioned proximate to the storage vessel 20.

The valve 14, the flow meter 16, and the controller 12 may be coupled to a housing 58 and positioned in an interior space 60 defined by the housing 58. The flow meter 16 is fluidically engaged to the valve 14 within the housing 58. The housing 58 may be configured to be mountable to a surface, such as an interior wall of a cold room. Thus configured, an inlet connector 62 and an outlet connector 64 are engaged to and extend from the housing 58, as shown in FIG. 1. The inlet connector 62 is engaged to the flow meter 16 and is configured to engage the conduit 18 so that the conduit 18 is in fluidic communication with the flow meter 16. The outlet connector 64 is engaged to the valve 14 and is configured to engage the conduit 18 so that the conduit 18 is in fluidic communication with the valve 14. Each of the inlet connector 62 and the outlet connector 64 may comprise a hose barb fitting 66, as shown in FIG. 2, or other types of fitting, such as, but not limited to, push-to-connect fittings, threaded fittings, and the like. The three-way valve 56 may be engaged to and positioned between the flow meter 16 and the outlet connector 64, as shown in FIG. 2.

Figure 3:
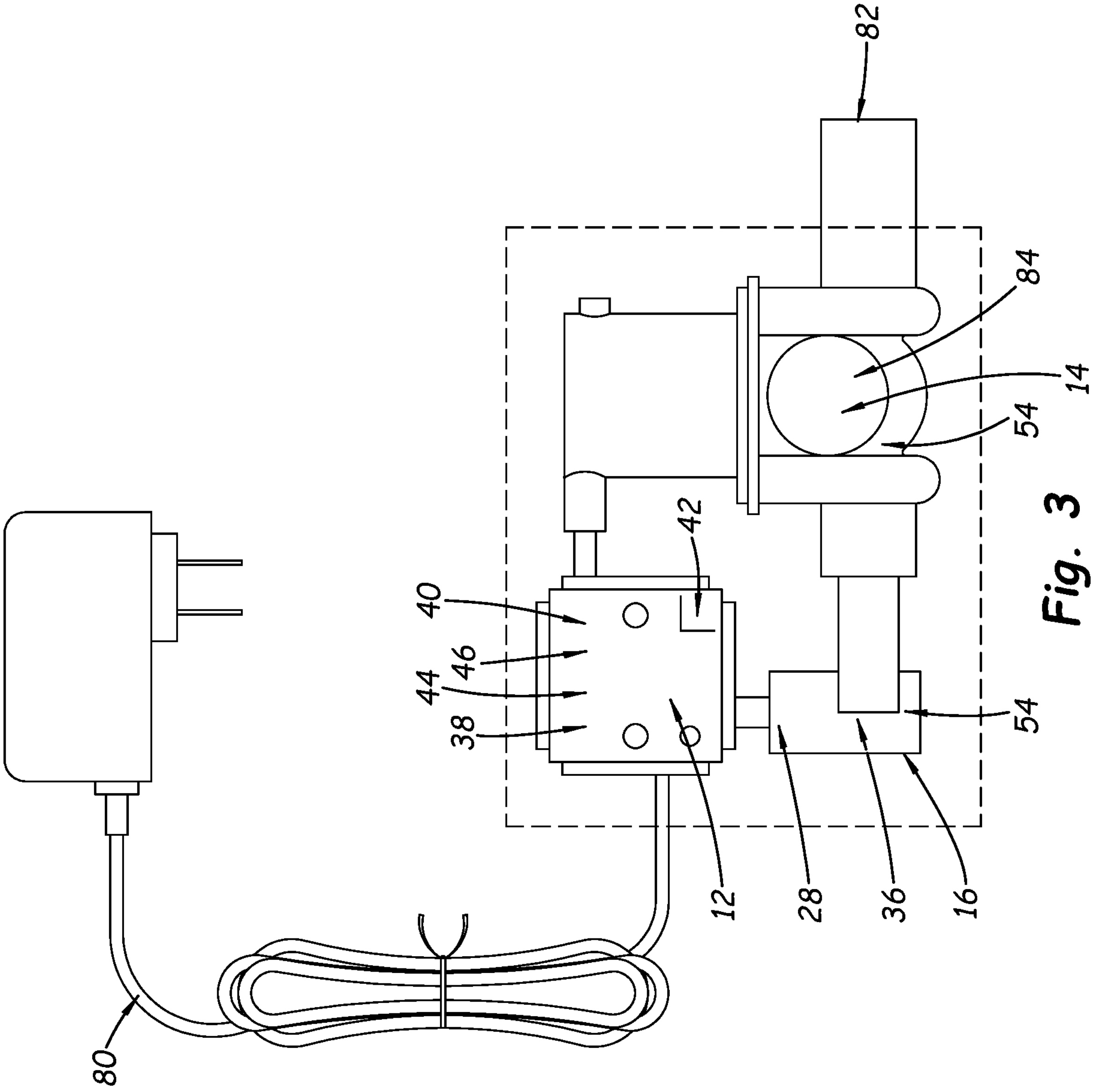
FIG. 3 is a top open view of an embodiment of the disclosure.

The housing 58 also may be configured to be mountable to an outlet 68 of the storage vessel 20 or to a keg tap 70 engaged to the outlet 68. For example, the inlet connector 62 may comprise a threaded connector 72, as shown in FIG. 3, which is rotationally engaged to the housing 58 and which is compatible with a threaded end 74 of the probe 50 of the keg tap 70. In this configuration, a minimal volume of space is available between the keg 26 and the flow meter 16, thereby limiting space that can fill with foam. As shown in FIG. 3, the outlet connector 64 comprises a shank 82, such as a G5/8 shank having threading identical to that of a probe 50, which is common to keg taps 70 used in the United States, allowing the housing 50 to be readily inserted into an existing setup comprising a keg 26, a keg tap 70, and a beer line 24. The shank 82 allows the beer line 24 to be readily decoupled for line cleaning purposes.

The present invention also anticipates the valve 14 being engaged to the inlet connector 62 and the flow meter 16 being engaged to the outlet connector 64, as this would entail only a small increase in the space that can fill with foam.

The fluid line monitoring and control assembly 10 may comprise an indicator 76 and a switch 78, which are engaged to the housing 58 and which are operationally engaged to the controller 12. The controller 12 is enabled to actuate the indicator 76 when the second signal is received. The indicator 76 informs the operator that the storage vessel 20 is empty and requires changing. Once the storage vessel 20 has been changed, the switch 78 is configured to be switched to signal the controller 12 to deactuate the indicator 76 and to open the valve 14.

The present invention anticipates the controller 12 being powered by at least one of a battery (not shown) and a power cord 80, which should be interpreted to mean that the controller 12 is powered by one or more batteries, a power cord 80, or a combination thereof. The present invention anticipates the power cord 80 being integral (permanently connected) to the housing 58 and the controller 12, or connectable by means of a connector (not shown). The present invention also anticipates the housing 58 having multiple connectors coupled thereto, would allow connection of the power cord 80 and use of tethering cords (not shown) for tethering of multiple fluid line monitoring and control assemblies 10.

The present invention anticipates the fluid line monitoring and control assembly 10 being a component of a beverage dispensing assembly 30, which may comprise one or more electronic devices 52 for interfacing with a user of the beverage dispensing assembly 30 and another electronic device 52 for interfacing with an operator of the beverage dispensing assembly 30. Beverage dispensing assemblies 30 are well known to those skilled in the art of beverage dispensing and include a wide variety of configurations, all of which depend on flow meters 16, valves 14, and most of which incorporate Foam on Beer detectors 54. A beverage dispensing assemblies 30 incorporating the fluid line monitoring and control assembly 10 offers several advantages and improvements. Many existing beverage dispensing assemblies 30 require expensive and bulky flow meters 16, which are positioned at some length from the keg 26 and which are not enabled to replace a Foam on Beer detector 54. The solenoid valve 84 and the thermal mass flow meter 28, under control of the controller 12, eliminate the need for Foam on Beer detectors 54. The fluid line monitoring and control assembly 10 also reduces the number of connections required for the beverage dispensing assembly 30, providing cost benefits and improving sanitation. Another existing option for use in beverage dispensing assemblies 30 is a dedicated and expensive keg tap, which incorporates a flow meter 16 but which is not enabled to function as a Foam on Beer detector 54. One configuration of the fluid line monitoring and control assembly 10 allows it to be threadedly engaged directly to an existing keg tap 70, thus reducing cost and eliminating loss of beer from the beverage line between the keg tap 70 and the flow meter 16.

Figure 4:
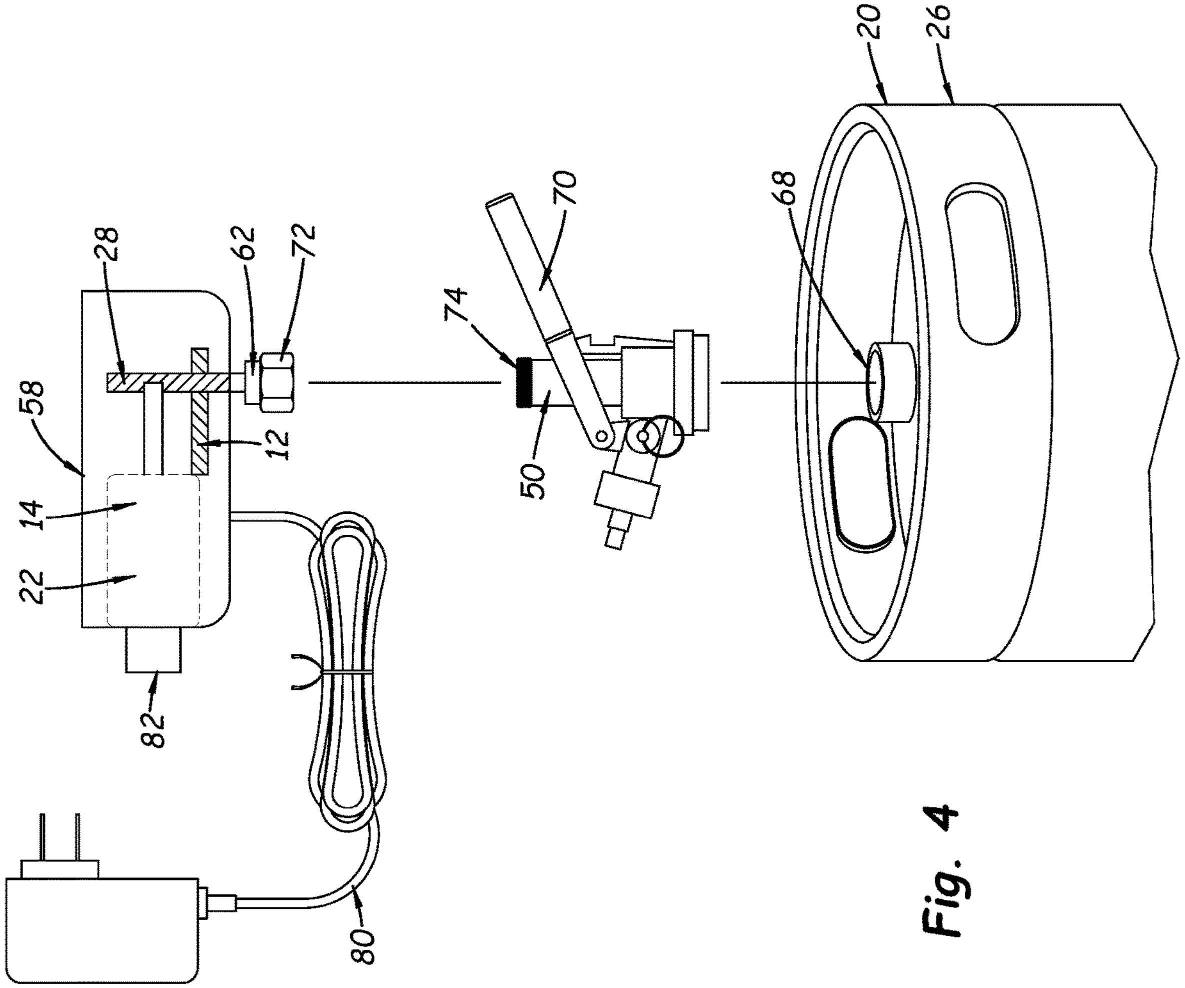
FIG. 4 is a side in-use view of an embodiment of the disclosure.
Figure 5:
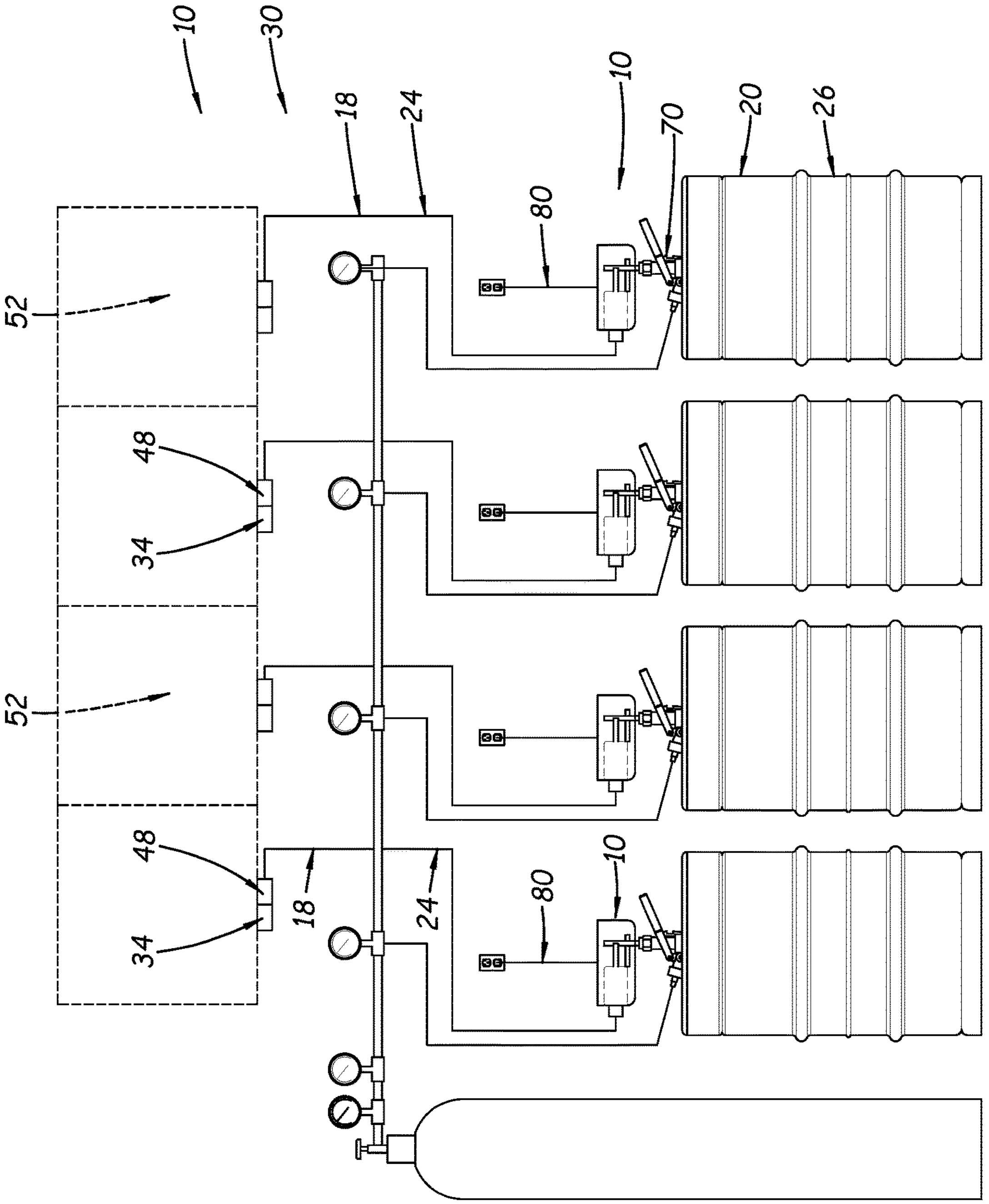
FIG. 5 is a front in-use view of an embodiment of the disclosure.
Figure 6:
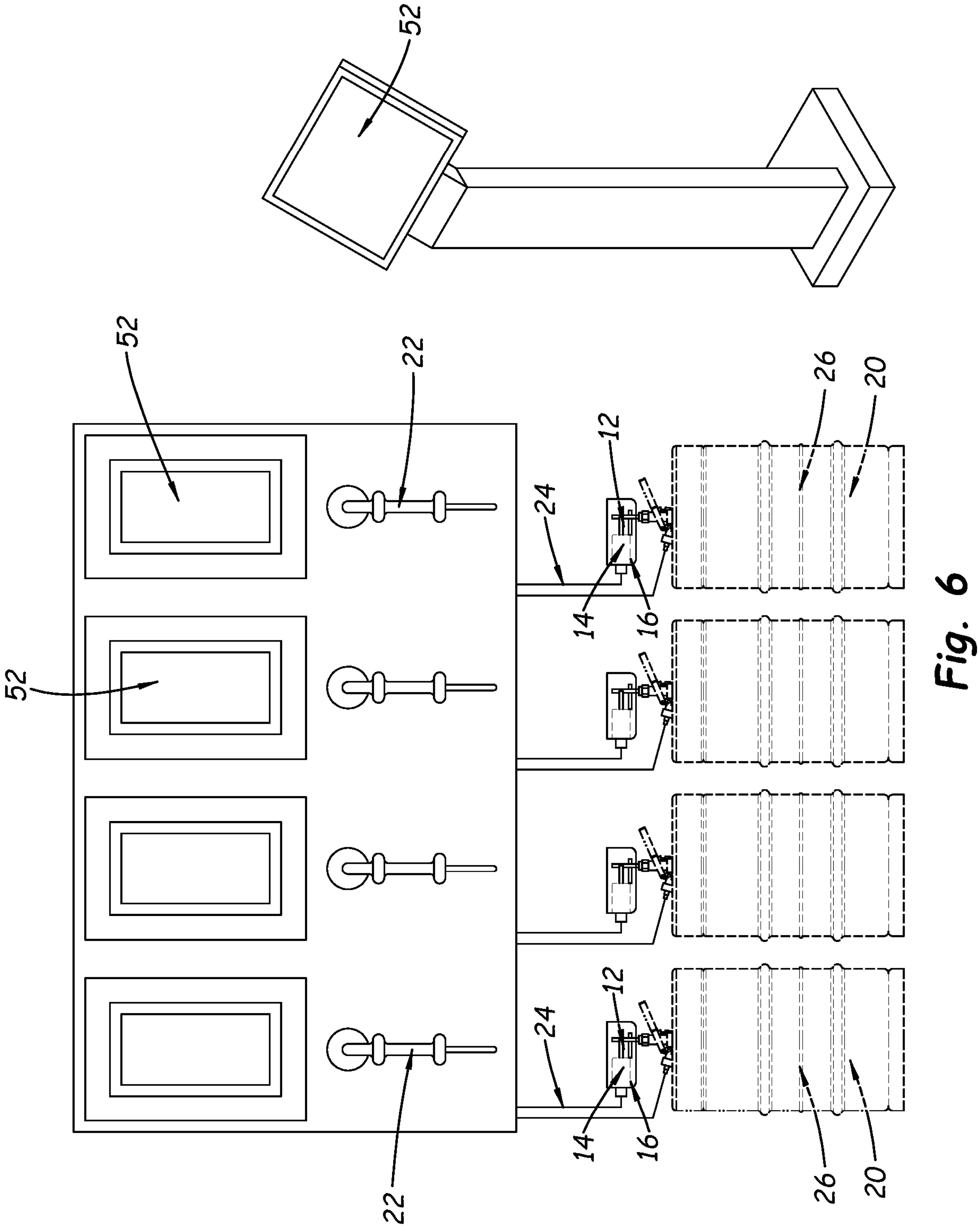
FIG. 6 is a rear in-use view of an embodiment of the disclosure.
Figure 7:
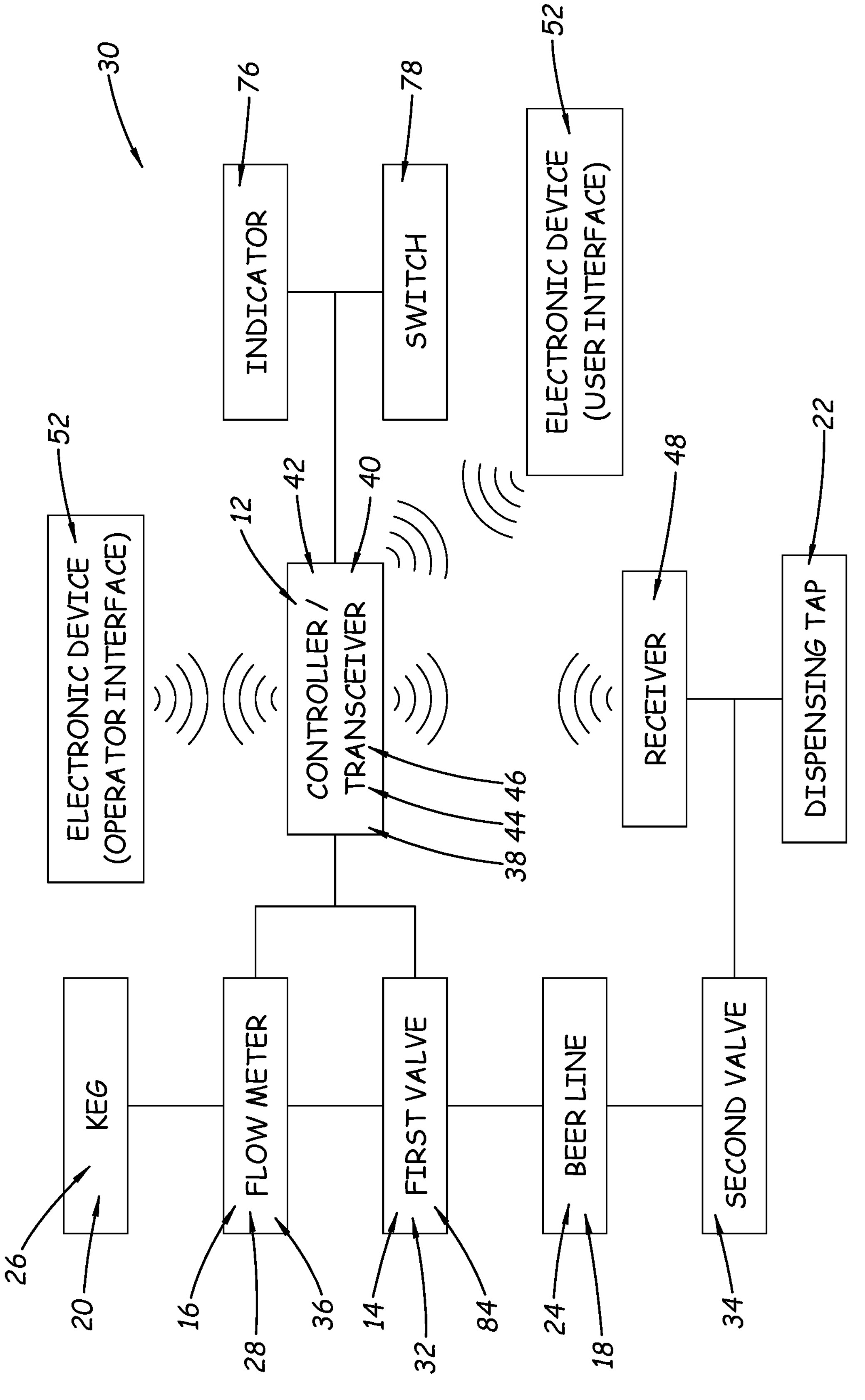
FIG. 7 is a block diagram of an embodiment of the disclosure.

In one example of use, the housing 58 is threadedly engaged to the threaded end 74 of the probe 50 using the threaded connector 72. The beer line 24 is attached to the outlet connector 64, positioning the solenoid valve 84 and the thermal mass flow meter 28 in-line with the beer line 24 extending to the dispensing tap 22, as shown in FIG. 4. As beer flows through the thermal mass flow meter 28, a steady voltage reading is sent to the controller 12, which determines the volume of beer dispensed at the dispensing tap 22. When foam begins to pass through the thermal mass flow meter 28, a fluctuating voltage reading is communicated to the controller 12, positioning the controller 12 to actuate the solenoid valve 84 to stop beer in the foam state from flowing into the beer line 24. With the beverage dispensing assembly 30 in this state, if the dispensing tap 22 is opened, beer in the beer line 24 can release carbon dioxide, causing in the beer line 24 to drip from the dispensing tap 22 and become flat. Thus, if opening of the dispensing tap 22 is allowed in a particular beverage dispensing assembly 30, installation of a secondary valve 34 proximate to the dispensing tap 22 will prevent release of carbon dioxide and flat beer in the beer line 24. The emptying of the keg 26 is communicated to the electronic device 52 so that the operator can change out the empty keg 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the elements is present, unless the context clearly requires that there be only one of the elements.

I claim:

1. A fluid line monitoring and control assembly comprising:

a valve configured to be insertable in-line with a conduit connecting a storage vessel to a dispensing tap, such that the valve is positioned proximate to the storage vessel, wherein the valve is configured for selectively closing the conduit for terminating flow of a beverage through the conduit;

a flow meter configured to be insertable in-line with the conduit, such that the flow meter is positioned proximate to the valve, the flow meter being configured for detecting at least one parameter indicative of each of a liquid state and a foam state of the beverage and for generating a first signal and a second signal, respectively, corresponding thereto;

a controller communicatively engaged to the valve and the flow meter, such that the controller is enabled for receiving the first signal and the second signal, positioning the controller for converting the first signal to a volume of the beverage flowing through the conduit;

foam in line programming code positioned on the controller enabling the controller for selectively actuating the valve for closing the conduit upon receipt of the second signal, wherein the valve is configured for terminating flow of the beverage in the foam state past the valve;

a housing defining an interior space, the valve, the flow meter, and the controller being coupled to the housing and positioned in the interior space, the flow meter being fluidically engaged to the valve within the housing;

an inlet connector engaged to and extending from the housing, the inlet connector being engaged to the flow meter and being configured for engaging one of:

the conduit, such that the conduit is in fluidic communication with the flow meter, an outlet of the storage vessel containing the beverage, such that the outlet is in fluidic communication with the flow meter, and a probe of a keg tap engaged to the outlet, such that the probe is in fluidic communication with the flow meter; and an outlet connector engaged to and extending from the housing, the outlet connector being engaged to the valve and being configured for engaging the conduit, such that the conduit is in fluidic communication with the primary valve.

2. The fluid line monitoring and control assembly of claim 1, further including:

the controller comprising a transceiver;

the valve comprising a primary valve, the primary valve being normally open;

a secondary valve configured to be insertable in-line with the conduit, such that the valve is positioned proximate to the dispensing tap, the secondary valve being normally closed; and a receiver communicatively engaged to the secondary valve and being in wireless communication with the controller via the transceiver, such that the controller is enabled for selectively actuating the secondary valve upon receipt of the second signal, wherein the primary valve and the secondary valve are configured for closing the conduit for terminating flow of the beverage through the conduit.

3. The fluid line monitoring and control assembly of claim 1, further including:

an indicator engaged to the housing and being operationally engaged to the controller, positioning the controller for actuating the indicator when the second signal is received; and a switch engaged to the housing operationally engaged to the controller, wherein the switch is configured for switching for signaling the controller for deactuating the indicator and for opening the valve.

4. The fluid line monitoring and control assembly of claim 1, wherein the inlet connector comprises a threaded connector, the threaded connector being complementary to the probe of the keg tap; and the outlet connector comprising a shank, the shank being threaded as is the probe.

5. The fluid line monitoring and control assembly of claim 1, further including a three-way valve engaged to and positioned between the flow meter and the outlet connector, wherein the three-way valve is configured for bleeding gas and foam positioned in the conduit between the flow meter and an empty storage vessel, such that the conduit can be filled with beverage after the conduit has been disconnected from an empty storage vessel and connected to a storage vessel containing the beverage.

6. A fluid line monitoring and control assembly comprising:

a valve configured to be insertable in-line with a conduit connecting a storage vessel to a dispensing tap, such that the valve is positioned proximate to the storage vessel, wherein the valve is configured for selectively closing the conduit for terminating flow of a beverage through the conduit, the valve comprising a solenoid valve;

a flow meter configured to be insertable in-line with the conduit, such that the flow meter is positioned proximate to the valve, the flow meter being configured for detecting at least one parameter indicative of each of a liquid state and a foam state of the beverage and for generating a first signal and a second signal, respectively, corresponding thereto, the second signal being of the same form as the first signal but differing in magnitude, stability, or frequency, the flow meter comprising a thermal mass flow meter, a mechanical flow meter, a pressure based flow meter, a variable area flow meter, an optical flow meter, a vortex flow meter, a sonar flow meter, an electromagnetic flow meter, an ultrasonic doppler flow meter, a Coriolas flow meter, or a laser doppler flow meter, the thermal mass flow meter comprising a microelectromechanical system sensor configured for thermopile sensing, the microelectromechanical system sensor being configured for measuring liquid flow rates of between 0.0 and 10.0 liters/minute;

a controller communicatively engaged to the valve and the flow meter, such that the controller is enabled for receiving the first signal and the second signal, the controller being programmed for converting the first signal to a volume of the beverage flowing through the conduit and for utilizing an algorithm to evaluate the first signal for a change in magnitude, stability, or frequency to determine if the beverage passing through the conduit has changed between the liquid state and the foam state, the controller comprising a transceiver, wherein the transceiver is configured for communicating wirelessly with an electronic device;

foam in line programming code positioned on the controller enabling the controller for selectively actuating the valve for closing the conduit upon receipt of the second signal, wherein the valve is configured for terminating flow of the beverage in the foam state past the valve;

a housing defining an interior space, the valve, the flow meter, and the controller being coupled to the housing and positioned in the interior space, the flow meter being fluidically engaged to the valve within the housing;

an inlet connector engaged to and extending from the housing, the inlet connector being engaged to the flow meter and being configured for engaging one of:

the conduit, such that the conduit is in fluidic communication with the flow meter, an outlet of the storage vessel containing the beverage, such that the outlet is in fluidic communication with the flow meter, and a probe of a keg tap engaged to the outlet, such that the probe is in fluidic communication with the flow meter, the inlet connector comprising a threaded connector, the threaded connector being complementary to the probe of the keg tap;

an outlet connector engaged to and extending from the housing, the outlet connector being engaged to the valve and being configured for engaging the conduit, such that the conduit is in fluidic communication with the valve, the outlet connector comprising a shank, the shank being threaded as is the probe;

an indicator operationally engaged to the controller, positioning the controller for actuating the indicator when the second signal is received; and a switch operationally engaged to the controller, wherein the switch is configured for switching for signaling the controller for deactuating the indicator and for actuating the valve.

7. The fluid line monitoring and control assembly of claim 6, further including a three-way valve engaged to and positioned between the flow meter and the outlet connector, wherein the three-way valve is configured for bleeding gas and foam positioned in the conduit between the flow meter and an empty storage vessel, such that the conduit can be filled with beverage after the conduit has been disconnected from the empty storage vessel and connected to a storage vessel containing the beverage.

8. The fluid line monitoring and control assembly of claim 6, further including:

the valve comprising a primary valve, the primary valve being normally open;

a secondary valve positioned in-line with the conduit and proximate to the dispensing tap, the secondary valve being normally closed; and a receiver communicatively engaged to the secondary valve and being in wireless communication with the controller via the transceiver, such that the controller is enabled for selectively actuating the primary valve and the secondary valve upon receipt of the second signal, such that the primary valve and the secondary valve are positioned for closing the conduit for terminating flow of the beverage through the conduit.

* * * * *